(12) United States Patent
Van Eerd et al.

(10) Patent No.: US 8,810,529 B2
(45) Date of Patent: Aug. 19, 2014

(54) ELECTRONIC DEVICE AND METHOD OF CONTROLLING SAME

(75) Inventors: Peter Anthony Van Eerd, Guelph (CA); Igor Krivoshlykov, Toronto (CA); Martin George Albert Guthrie, Waterloo (CA)

(73) Assignee: Blackberry Limited, Waterloo (CA)

( * ) Notice: Subject to any disclaimer, the term of this patent is extended or adjusted under 35 U.S.C. 154(b) by 341 days.

(21) Appl. No.: 13/025,399

(22) Filed: Feb. 11, 2011

(65) Prior Publication Data

US 2012/0206373 A1    Aug. 16, 2012

(51) Int. Cl.
*G06F 3/041*    (2006.01)

(52) U.S. Cl.
USPC ......... 345/173; 345/174; 178/18.06; 715/863

(58) Field of Classification Search
USPC .................... 345/173–178; 178/18.01–18.11; 715/863
See application file for complete search history.

(56) References Cited

U.S. PATENT DOCUMENTS

| | | | |
|---|---|---|---|
| 7,081,887 B2 * | 7/2006 | Harrison ....................... | 345/173 |
| 2006/0033751 A1 | 2/2006 | Keely et al. | |
| 2007/0109277 A1 | 5/2007 | Lira | |
| 2008/0165160 A1 * | 7/2008 | Kocienda et al. ............. | 345/175 |
| 2009/0273571 A1 * | 11/2009 | Bowens ......................... | 345/173 |
| 2009/0292989 A1 | 11/2009 | Matthews et al. | |
| 2009/0300530 A1 * | 12/2009 | Falchuk ......................... | 715/764 |
| 2011/0025628 A1 * | 2/2011 | Lin et al. ....................... | 345/173 |

FOREIGN PATENT DOCUMENTS

JP    2002-189567    7/2002

OTHER PUBLICATIONS

Extended European Search Report dated Jul. 21, 2011, issued from the corresponding EP patent application No. 11154203.1.
Office Action dated Oct. 9, 2012, issued in respect of corresponding European Patent Application No. 11154203.1.
English translation of Office Action dated May 29, 2013, issued in respect of corresponding Korean Patent Application No. 10-2012-0012844.
Examiner'Report dated Nov. 22, 2013, issued in respect of corresponding Canadian Patent Application No. 2,767,707.

* cited by examiner

*Primary Examiner* — Koosha Sharifi-Tafreshi
(74) *Attorney, Agent, or Firm* — Geoffrey deKleine; Borden Ladner Gervais LLP

(57) ABSTRACT

A method includes detecting movement of a touch on a touch-sensitive display of an electronic device from a first touch location to a second touch location. When the distance between the first touch location and the second touch location meets a first threshold, the second touch location is reported to an application layer of the electronic device. After the first threshold is met, a third touch location is reported to the application layer when movement of the touch from the second touch location to the third touch location is detected and the distance between the second touch location and the third touch location meets a second threshold.

20 Claims, 5 Drawing Sheets

ELECTRONIC DEVICE AND METHOD OF CONTROLLING SAME

FIELD OF TECHNOLOGY

The present disclosure relates to electronic devices including, but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones, Personal Digital Assistants (PDAs), tablet computers, and laptop computers, with wireless network communications or near-field communications connectivity such as Bluetooth® capabilities.

Portable electronic devices such as PDAs, or tablet computers are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive display may be modified depending on the functions and operations being performed.

Improvements in electronic devices with touch-sensitive displays are desirable.

DETAILED DESCRIPTION

Figure 1:
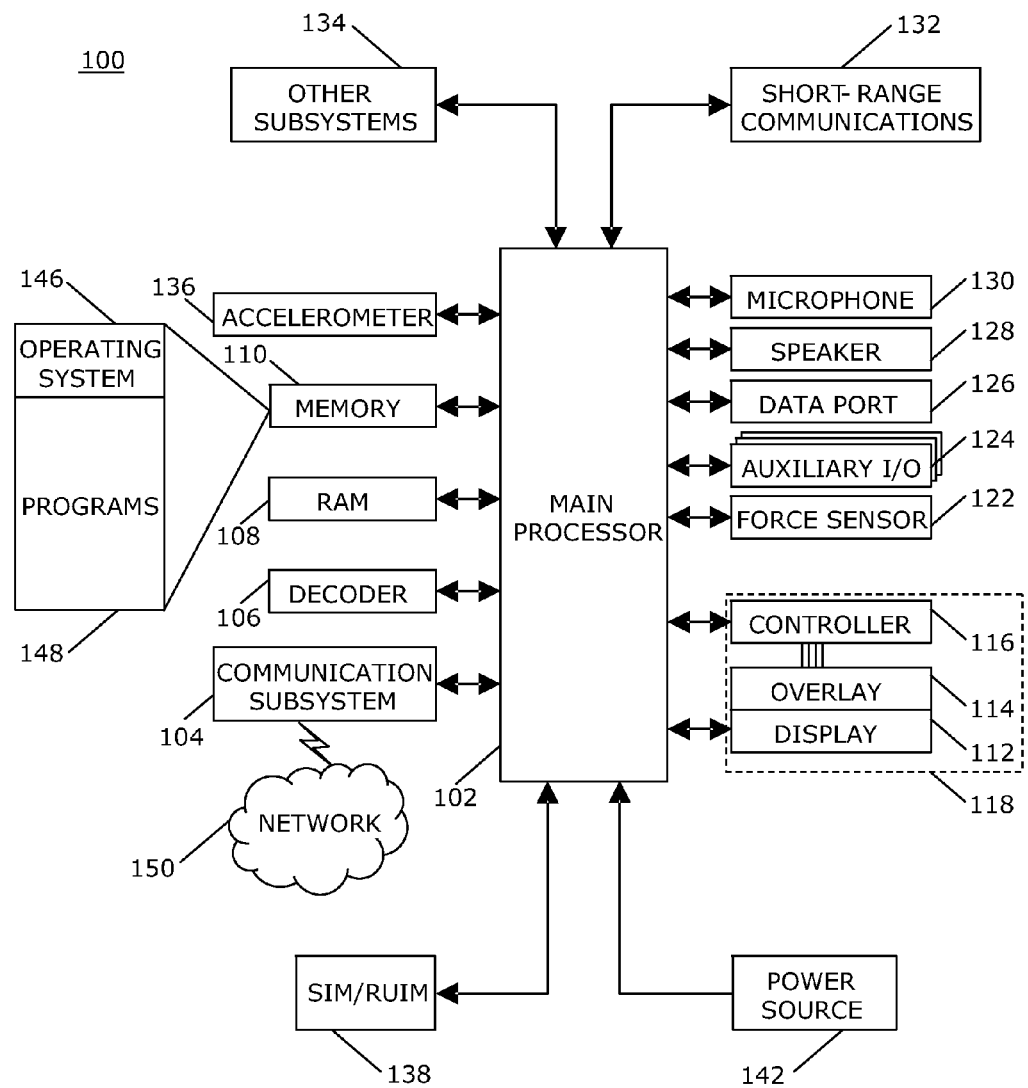
FIG. 1 is a block diagram of a portable electronic device in accordance with an example embodiment.

The following describes an electronic device and a method that includes detecting movement of a touch on a touch-sensitive display of an electronic device from a first touch location to a second touch location. When the distance between the first touch location and the second touch location meets a first threshold, the second touch location is reported to an application layer of the electronic device. After the first threshold is met, a third touch location is reported to the application layer when movement of the touch from the second touch location to the third touch location is detected and the distance between the second touch location and the third touch location meets a second threshold.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smartphones, wireless organizers, PDAs, wirelessly enabled notebook computers, tablet computers, and so forth. The portable electronic device may also be a portable electronic device without wireless communication capabilities, such as a handheld electronic game device, digital photograph album, digital camera, or other device.

A block diagram of an example of an electronic device 100 is shown in FIG. 1. The electronic device 100, which may be a portable electronic device, includes multiple components, such as a processor 102 that controls the overall operation of the electronic device 100. The electronic device 100 presently described optionally includes a communication subsystem 104 and a short-range communications 132 module to perform various communication functions, including data and voice communications. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, one or more actuators 120, one or more force sensors 122, an auxiliary input/output (I/O) subsystem 124, a data port 126, a speaker 128, a microphone 130, short-range communications 132, and other device subsystems 134. User-interaction with a graphical user interface may be performed through the touch-sensitive overlay 114. The processor 102 interacts with the touch-sensitive overlay 114 via the electronic controller 116. Information, such as text, characters, symbols, images, icons, and other items that may be displayed or rendered on an electronic device, is displayed on the touch-sensitive display 118 via the processor 102. The processor 102 may interact with an orientation sensor such as an accelerometer 136 to detect direction of gravitational forces or gravity-induced reaction forces, for example, to determine the orientation of the electronic device 100. The processor 102 may comprise a single processor or multiple processors.

To identify a subscriber for network access, the electronic device 100 uses a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal, such as a text message, an e-mail message, or web page download, is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104, for example. For voice communications, the overall operation of the portable electronic device 100 may be similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. When the touch is detected, one or more signals are provided to the controller 116 from which the touch location may be determined. Signals may be provided to the controller at regular intervals in time for a touch, also known as sampling, such that changes in location of the touch may be detected. A touch may be detected from any suitable contact member, such as a finger, thumb, appendage, or other objects, for example, a stylus, pen, or other pointer, depending on the nature of the touch-sensitive display 118. The controller 116 and/or the processor 102 may detect a touch by any suitable contact member on the touch-sensitive display 118. Multiple simultaneous touches may be detected.

One or more gestures may also be detected by the touch-sensitive display 118. A gesture, such as a swipe, also known as a flick, is a particular type of touch on a touch-sensitive display 118 that begins at an origin point and continues to an end point. A gesture may be identified by attributes of the gesture, including the origin point, the end point, the distance traveled, the duration, the velocity, and the direction, for example. A gesture may be long or short in distance and/or duration. Two points of the gesture may be utilized to determine a direction of the gesture. A tap may be detected by the touch-sensitive display and other touches may be distinguished from a tap by the distance traveled by the touch. For example, a touch that has a beginning and end point that are very close together may be a tap, a touch that has a beginning and end point that are farther apart may be a gesture such as a swipe. Although the electronic device described herein distinguishes taps from gestures such as swipes, the process may be practiced without distinguishing between the two.

An optional force sensor 122 or force sensors is disposed in any suitable location, for example, between the touch-sensitive display 118 and a back of the electronic device 100 to detect a force imparted by a touch on the touch-sensitive display 118. The force sensor 122 may be a force-sensitive resistor, strain gauge, piezoelectric or piezoresistive device, pressure sensor, or other suitable device. Force as utilized throughout the specification refers to force measurements, estimates, and/or calculations, such as pressure, deformation, stress, strain, force density, force-area relationships, thrust, torque, and other effects that include force or related quantities.

Force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 2:
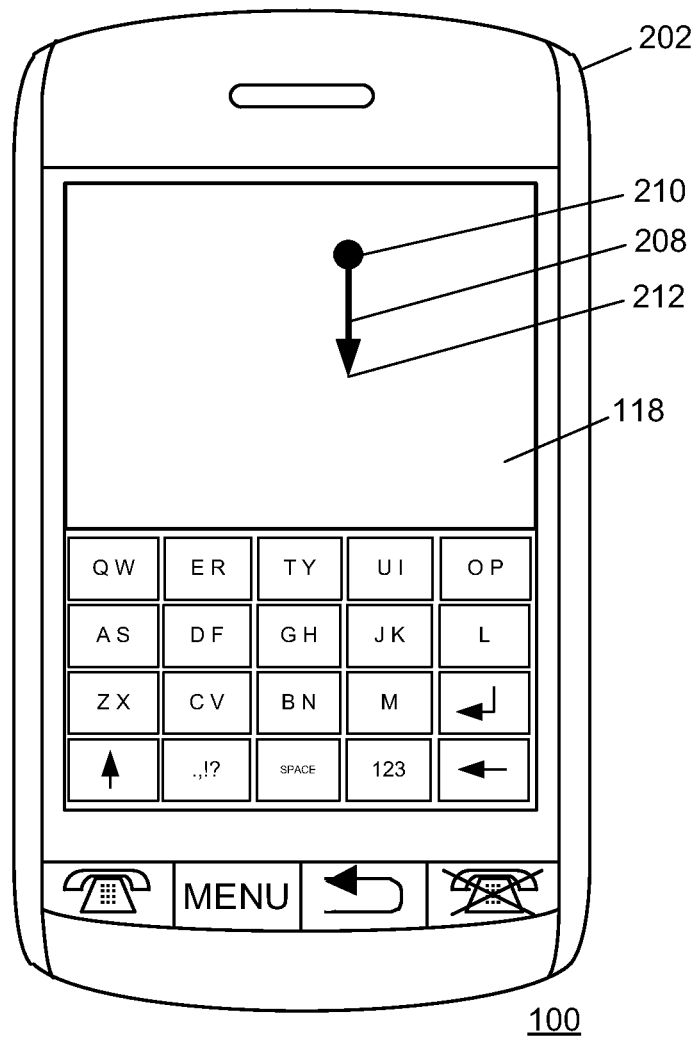
FIG. 2 is a front view of an example of a portable electronic device in accordance with the disclosure.

A front view of an example of the electronic device 100 is shown in FIG. 2. The electronic device 100 includes a housing 202 in which the touch-sensitive display 118 is disposed. The housing 202 and the touch-sensitive display 118 enclose components such as the components shown in FIG. 1.

A gesture 208 received on the touch-sensitive display 118 is illustrated by the arrow, beginning at the origin point 210 and finishing at the end point 212. A gesture 208 is detected by analysis of the touch data received at the controller. The gesture may be utilized to perform any function or operation such as, for example, scrolling, panning, or dragging. Very small or slight movements of the touch on the touch-sensitive display 118 may be detected and may cause new touch locations to be reported by the controller 116 to the operating system (OS) layer or from the OS layer to the application layer, which may cause jitter or unintentional movement or vibration of the displayed content on the touch-sensitive display. Frequent reporting of new or spurious touch locations increases processing requirements and may decrease electronic device 100 performance, for example, by unnecessarily draining the battery or diverting processor resources.

The signals received by the controller 116 may be noisy, causing jitter, e.g., slight movement, vibration, or change of the touch location. The noise may be, for example, from noise caused by an analog touch controller, quantization error, low signal level when a touch causes a small change in measured capacitance, power supply noise, interference, fragmentation from a touch beginning in the middle of a scan, and so forth, and any combination thereof. The noise may also cause new touch locations to be reported by the controller 116 to the OS layer or from the OS layer to the application layer.

A threshold distance may be utilized to determine when to report movement of the touch to a new location. Movement of a touch that does not meet the threshold distance may not be reported to the application layer and thus, the new touch location may not be utilized. Reporting may include reporting to the processor, the OS layer, or the application layer. When the movement of the touch meets the threshold distance, the threshold is changed to a lower threshold to increase responsiveness to touch movement, for example, for scrolling, panning, or dragging operations. A distance meets a threshold when the distance is equal to or greater than the threshold.

Figure 3:
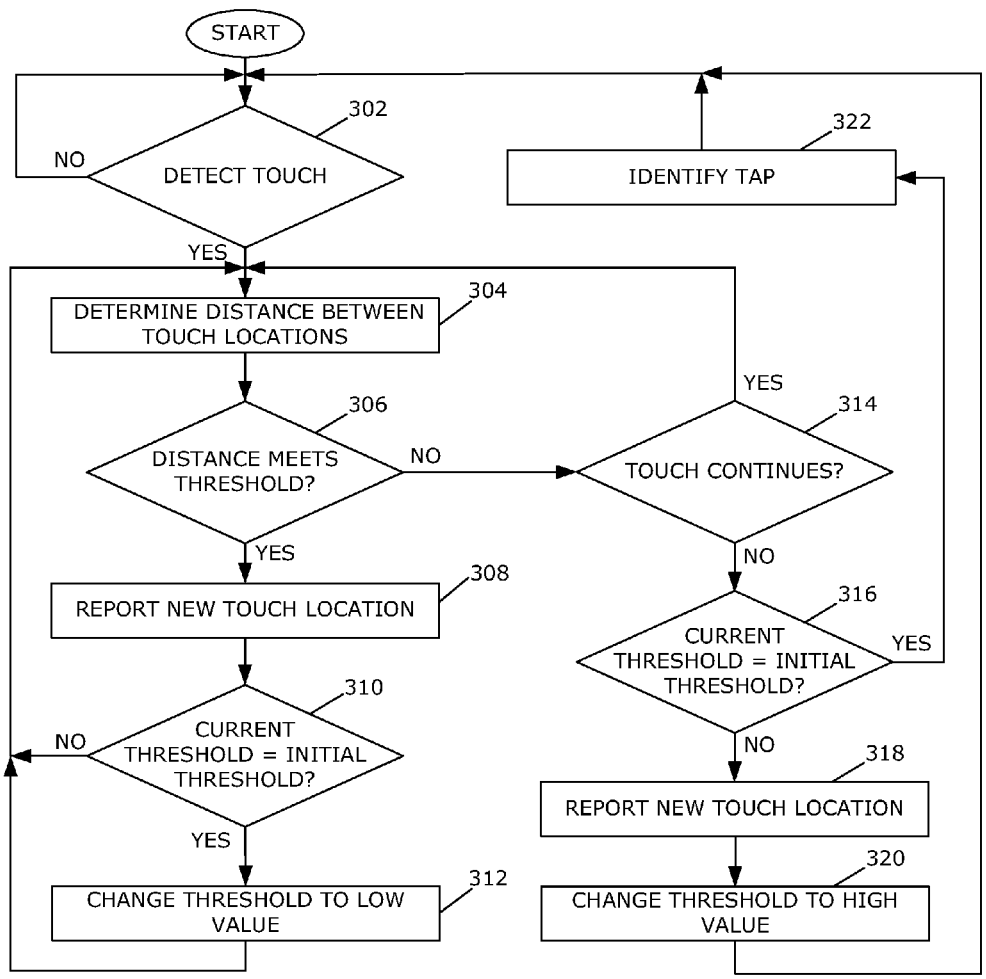
FIG. 3 is a flowchart illustrating a method of controlling the portable electronic device in accordance with the disclosure.

A flowchart illustrating a method of filtering touch data at an electronic device, such as the electronic device 100, is shown in FIG. 3. The method may be carried out by computer-readable code executed, for example, by the controller 116 and/or the processor 102, for example, at an OS layer. Coding of software for carrying out such a method is within the scope of a person of ordinary skill in the art given the present description. The method may contain additional or fewer processes than shown and/or described, and may be performed in a different order.

When a touch is detected 302, the distance between the detected touch location and the previously reported touch location is determined 304. Movement of the touch is detected by determining the distance between the detected touch location and the previously reported touch location. The previously reported touch location is a touch location taken at a previous sampling time. The distance may be, for example, a distance in a straight line from beginning to end point or a total combined distance along each of two, i.e., x and y, axes.

When the distance meets a threshold at 306, the new touch location is reported 308 by the controller 116 or by the OS layer. The new touch location is reported to the application layer to utilize the new touch location, for example, to control the displayed content. The distance meets the threshold, for example, when the distance is equal to or greater than the threshold. Initially, the threshold may be any suitable distance, such as 10 to 20 pixels or 2 to 3 millimeters.

Initially, the threshold is set at an initial or high threshold. The threshold is changed 312 to the low threshold after a touch is detected and the touch moves a distance that meets the initial threshold. The low threshold may be any suitable value, such as 1 pixel. The threshold may be changed by the application for which information is displayed on the touch-sensitive display 118 or that is active at the time the touch is detected. Thus, the application running on the electronic device changes the threshold at the controller 116 or, alternatively, the OS layer and the thresholds may differ depending on the information displayed in an application and/or may differ from application to application. The process continues at 302.

When the distance does not meet the threshold at 306, the process continues at 314. When the touch continues at 314, or when another touch that overlaps in time with the touch continues, the process continues at 304. When touches are no longer detected on the touch-sensitive display 118 at 314, the process continues at 316. When the threshold is not set at the initial threshold at 316, the end of touch is reported 318 by the controller 116 or by the OS layer, and the threshold is changed 320 to the initial threshold. Thus, after changing the threshold to the low threshold value, the low threshold value is utilized for all touches until no touches are detected on the touch-sensitive display 118. Only a single threshold is utilized at any one time.

When the threshold is set at the initial threshold at 316, the touch is identified 322 as a tap on the touch-sensitive display 118. Each touch is determined to be a gesture or tap on the touch-sensitive display 118.

Controllers for touch-sensitive displays 118 typically include a single threshold. A single threshold is utilized at any point in time and controlling the threshold by changing the value facilitates filtering, for example, at the controller. The process of detecting the touch at 302, determining the distance at 304, determining when the threshold is met at 306, and determining when the touch continues at 314 may all be carried out at the controller 116. The controller may be utilized to remove noise and to distinguish taps from gestures. Utilizing the threshold that is changed when the distance traveled by the touch meets the threshold, fewer touch locations may be reported, decreasing processing requirements and increasing portable electronic device 100 performance.

In an example of filtering touch data at an electronic device, a touch, such as the gesture 208 illustrated in FIG. 2, is detected by the portable electronic device 100. The distance between the detected touch location and the previously reported touch location is determined. In the present example, the threshold may be a threshold of 15 pixels, and the distance meets the threshold. The new touch location is reported by the controller 116, and the threshold is changed to 1 pixel in this example. As the touch continues, the distance between the detected touch location and the previously reported touch location is determined. When the distance meets the low threshold, the new touch location is reported by the controller. When the touch finishes at the end point 212, the threshold changes to 15 pixels.

Figure 4:
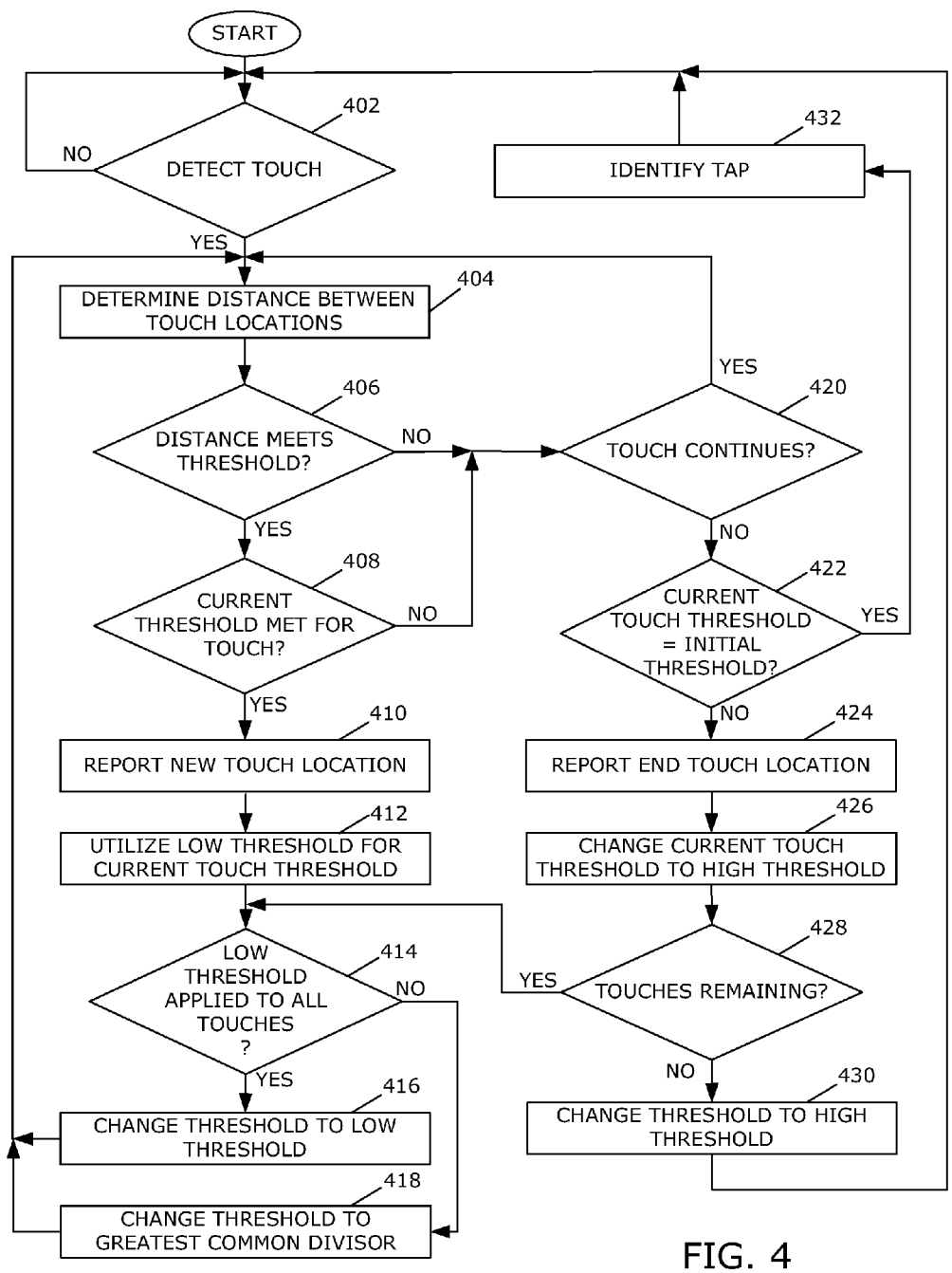
FIG. 4 is a flowchart illustrating another method of controlling the portable electronic device in accordance with the disclosure.
Figure 5:
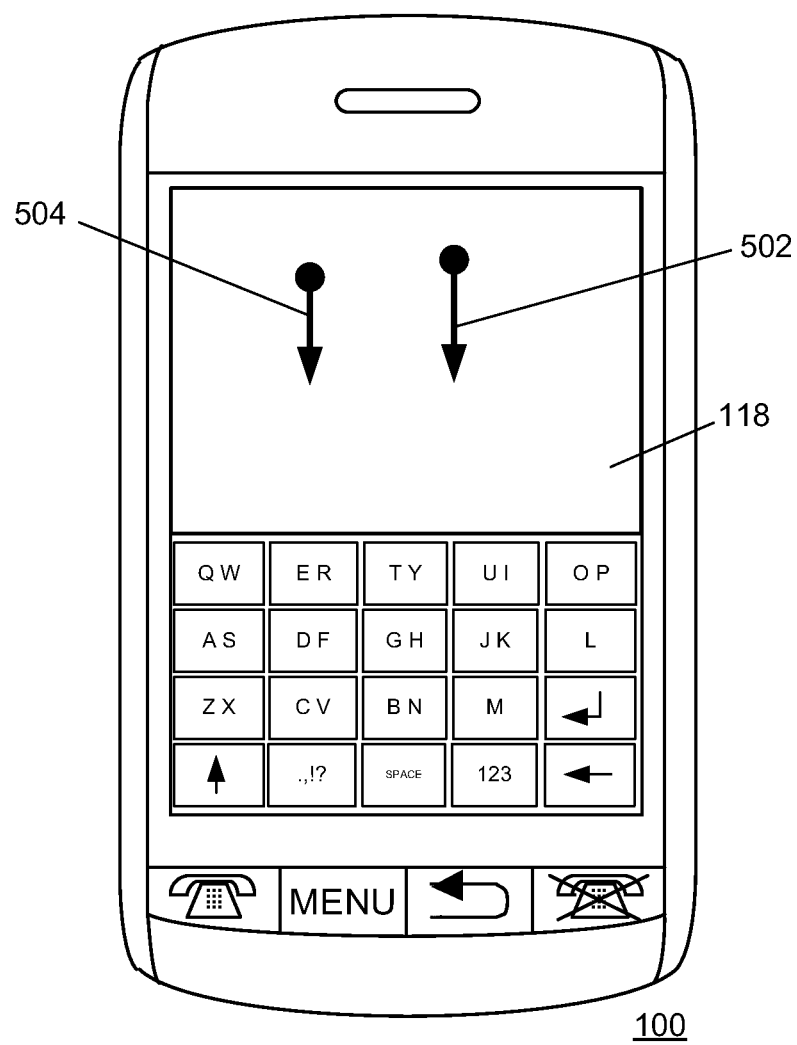
FIG. 5 illustrates gestures on the touch-sensitive display in accordance with the disclosure.

A flowchart illustrating another method of filtering touch data at an electronic device, such as the electronic device 100, is shown in FIG. 4. The method may be carried out by computer-readable code executed, for example, by the controller 116 and the processor 102, for example, at an OS layer. Coding of software for carrying out such a method is within the scope of a person of ordinary skill in the art given the present description. The method may contain additional or fewer processes than shown and/or described, and may be performed in a different order. Many of the processes of FIG. 4 are described above and are not described again in detail.

In the example of FIG. 4, a threshold is stored at the controller 116, and the threshold stored at the controller may be changed. A threshold is also associated with each touch, referred to herein as the current touch threshold, and the current touch threshold is stored at the OS layer. The current touch thresholds may differ for two touches that overlap at least partially in time. When a touch is detected 402, the distance between the detected touch location and the previously reported touch location is determined 404. When the distance meets the threshold at the controller at 406, the process continues at 408. The new touch location is sent to the OS layer and the OS layer determines when the distance meets the current touch threshold that is set for that touch at 408. The current threshold for the touch, which is stored at the OS layer, may differ from the threshold utilized at the controller at 406 when, for example, two touches are detected on the touch-sensitive display 118. When the current touch threshold is met at 408, the new touch location is reported 410 and the low touch threshold value is utilized 412 for the current touch threshold.

When the low threshold is applied to all touches, i.e., the current touch threshold for each touch is the low threshold at 414, the threshold at the controller 116 changes 416 to the low threshold. When the low threshold is not applied to all touches, for example, a second touch has not moved a distance that meets the high threshold, the threshold at the controller 116 may optionally be changed 418 to the greatest common divisor of the low threshold and the high threshold. The greatest common divisor may be utilized to facilitate reporting of distances that meet the high threshold when the high threshold is not a multiple of the low threshold. For example, when a low threshold is 10 pixels and the high threshold is 15 pixels, the greatest common divisor, which is 5, may be utilized to facilitate reporting of moves.

When the current touch threshold is not met at 408, the process continues at 420. When the touch continues at 420, the process continues at 404. When the touch ends at 420, the process continues at 422. When the current touch threshold is not set at the initial threshold, the process continues at 424, the end touch location is reported to the application layer 424 and the current touch threshold at the OS layer is changed 426 to the high threshold. When one or more touches remain on the touch-sensitive display 118 at 428, the process continues at 414. When no further touches are detected on the touch-sensitive display 118 at 428, the threshold at the controller 116 is changed 430 to the high threshold.

When the threshold is equal to the initial threshold at 422, the touch is identified 432 as a tap on the touch-sensitive display 118. Each touch is determined to be a gesture or tap on the touch-sensitive display 118.

The process of detecting the touch at 402, determining the distance at 404, determining when the threshold is met at 406, and determining when the touch continues at 424 may all be carried out at the controller 116. The controller may be utilized to remove noise and to distinguish taps from gestures. Utilizing the threshold that is changed when the distance traveled by the touch meets the threshold, fewer touch locations may be reported, decreasing processing requirements and increasing portable electronic device 100 performance.

In an example of filtering touch data at an electronic device, a touch, such as the gesture 502, is detected by the portable electronic device 100. A second touch, such as the gesture 504, is detected. The gesture 504 overlaps at least partially in time with the gesture 502. The distance between the detected touch location and the previously reported touch location for the gesture 502 is determined. In the present example, the threshold may be a threshold of 15 pixels and the distance meets the threshold at the controller 116. The current touch threshold for the gesture 502 is also 15 pixels and the current touch threshold is met at the OS layer. The new touch location for the gesture 502 is reported to the application layer. The gesture 504 has not yet met the high threshold and the threshold at the controller 116 is set to the greatest common divisor of the low threshold and the high threshold. The low threshold may be, for example, 10 pixels. The greatest common divisor is 5 and the threshold at the controller 116 is set to 5. Utilizing the greatest common divisor, a gesture that moves a distance of 10 pixels is reported to the OS layer, the OS layer determines that the current threshold of 15 pixels is not met, and the new touch location is not reported to the application layer. A reported movement of an additional 5 pixels meets the threshold at the controller and the new touch location is reported to the OS layer. The OS layer determines that the total distance moved since the last touch location was reported to the application is 15 pixels, which meets the current touch threshold at the OS layer, and the new touch location is reported to the application layer.

When the current touch threshold at the OS layer is equal to the low threshold for all touches, the threshold at the controller 116 is set to the low threshold value. The threshold at the controller 116 is set to the initial threshold value when all touches end.

Alternatively, the low threshold may be utilized rather than utilizing the greatest common divisor at the controller 116. The low threshold may be a whole number divisor of the high threshold or may be suitably low for accurate detection and therefore the low threshold may be utilized rather than the greatest common divisor. The low threshold may be utilized at the controller at 412 and the processes at 414, 416, and 418 may not be utilized in the method.

By dynamically changing move thresholds, movements of a touch on a touch-sensitive display may be filtered to reduce jitter. A higher threshold may be utilized to detect movement of the touch and a lower threshold may be utilized during movement of the touch. When the higher threshold is met, smaller movements are utilized. The two thresholds may be utilized by changing the threshold value at the controller of the touch-sensitive display or at, for example, an operating system layer at the processor. Utilizing more than one threshold at the controller or at the OS layer, fewer touch locations may be reported to the application layer, decreasing processing requirements and increasing portable electronic device performance. The first threshold may also be utilized to distinguish between gestures and taps on the touch-sensitive display. Each touch may therefore be identified as one of a tap or a moving touch. The chance of inadvertent scrolling from small movements of the touch may be reduced.

A method includes detecting movement of a touch on a touch-sensitive display of an electronic device from a first touch location to a second touch location. When the distance between the first touch location and the second touch location meets a first threshold, the second touch location is reported to an application layer of the electronic device. After the first threshold is met, a third touch location is reported to the application layer when movement of the touch from the second touch location to the third touch location is detected and the distance between the second touch location and the third touch location meets a second threshold.

An electronic device includes a processor and a touch-sensitive display including touch sensors and a controller arranged to detect a touch and to detect movement of the touch from a first touch location to a second touch location. The electronic device is configured to, when the distance between the first touch location and the second touch location meets a first value of a threshold, report the second touch location to an application layer at the processor and change the threshold to a second value such that when movement of the touch from the second touch location to a third touch location is detected and the distance between the second touch location and the third touch location meets the second value, the third touch location is reported to the application layer.

A method includes detecting movement of a touch on a touch-sensitive display of an electronic device from a first touch location to a second touch location, when the distance between the first touch location and the second touch location meets a first threshold, reporting the second touch location to an application layer of the electronic device, and after the first threshold is met, reporting a third touch location to an operating system layer when movement of the touch from the second touch location to the third touch location is detected and the distance between the second touch location and the third touch location meets a second threshold.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
    detecting movement of a single touch on a touch-sensitive display of an electronic device from a first touch location to a second touch location;
    in response to determining that a first distance between the first touch location and the second touch location meets a first value of a threshold:
        reporting the second touch location to an application layer of the electronic device; and changing the threshold to a second value that is lower than the first value of the threshold after determining that the first distance meets the first value of the threshold;

after the first distance meets the first value of the threshold, reporting a third touch location to the application layer in response to determining that the single touch continues from the second touch location to the third touch location and a second distance between the second touch location and the third touch location meets the second value.

2. The method according to claim 1, wherein the value of the threshold is utilized to compare to distances and determine whether to report additional touch locations after changing the threshold to the second value, until the single touch ends.

3. The method according to claim 1, comprising changing the threshold from the second value to the first value in response to detecting an end of the single touch.

4. The method according to claim 1, comprising utilizing the second touch location in an application when the second touch location is reported.

5. The method according to claim 1, comprising utilizing the third touch location in an application when the third touch location is reported.

6. The method according to claim 1, wherein the first value of the threshold is a value at a controller of the electronic device.

7. The method according to claim 1, wherein the distance between the first touch location and the second touch location is determined at a controller of the electronic device.

8. The method according to claim 1, wherein when the distance between the first touch location and the second touch location does not meet the value of the first threshold, the single touch is determined to be a tap.

9. The method according to claim 1, wherein the second value of the threshold is less than the first value of the threshold.

10. The method according to claim 1, wherein detecting movement comprises comparing the second location to the first location to determine a difference.

11. The method according to claim 1, comprising:
detecting movement of a second touch from a fourth touch location to a fifth touch location on the touch-sensitive display, which second touch overlaps at least partially in time with the single touch,
after the distance meets the first value of threshold, reporting the fourth touch location to the application layer when a distance of movement between the fourth touch location and the fifth touch location meets the second value.

12. The method according to claim 11, wherein the second value of the threshold is changed to the first value of the threshold when the touches end.

13. A computer-readable storage device having computer-readable code executable by at least one processor of the portable electronic device to perform the method of claim 1.

14. An electronic device comprising:
a processor;
a touch-sensitive display including touch sensors and a controller arranged to detect a single touch and to detect movement of the single touch from a first touch location to a second touch location;
wherein the electronic device is configured to, in response to determining that a first distance between the first touch location and the second touch location meets a first value of a threshold,
report the second touch location to an application layer at the processor; and
change the threshold to a second value that is less than the first value of the threshold after determining that the first distance meets the first value of the threshold, such that when the single touch continues from the second touch location to a third touch location, and a second distance between the second touch location and the third touch location meets the second value of the threshold, the third touch location is reported to the application layer.

15. A method comprising:
detecting movement of a single touch on a touch-sensitive display of an electronic device from a first touch location to a second touch location;
when the single touch ends and a first distance between the first touch location and the second touch location does not meet a first threshold, identifying the single touch as a tap;
when the first distance between the first touch location and the second touch location meets the first threshold, reporting the second touch location to an application layer of the electronic device;
after the first distance between the first touch location and the second touch location meets the first threshold:
changing from a first threshold to a second threshold that is lower than the first threshold;
reporting a third touch location to an operating system layer when the single touch continues from the second touch location to a third touch location and a second distance between the second touch location and the third touch location meets the second threshold;
wherein the third touch location is not reported to the operating system layer when the single touch continues from the second touch location to the third touch location and the second distance between the second touch location and the third touch location does not meet the second threshold.

16. The method according to claim 15, comprising reporting the third touch location to the application layer when the third touch location meets a third threshold.

17. The method according to claim 16, wherein the third threshold is stored at the OS layer.

18. The method according to claim 15, comprising detecting movement of a second touch on the touch-sensitive display from a fifth location to a sixth location and when the distance between the fifth location and the sixth location meets the second threshold, reporting the sixth touch location to the operating system layer.

19. The method according to claim 18, comprising reporting the sixth touch location to the application layer when the distance between the fifth location and the sixth location meets a third threshold at the operating system layer.

20. The method according to claim 15, wherein the second threshold is a greatest common divisor of the first threshold and a third, lower threshold.

* * * * *